J. SMOKEY.
CALF WEANER.
APPLICATION FILED MAY 15, 1915.

1,181,935. Patented May 2, 1916.

Inventor
J. Smokey

Witnesses

Attorney

UNITED STATES PATENT OFFICE.

JOHN SMOKEY, OF WAVERLY, OHIO.

CALF-WEANER.

1,181,025.

Specification of Letters Patent.

Patented May 2, 1916.

Application filed May 15, 1914. Serial No. 838,741.

*To all whom it may concern:*

Be it known that I, JOHN SMOKEY, a citizen of the United States, residing at Waverly, in the county of Pike, State of Ohio, have invented certain new and useful Improvements in Calf-Weaners; and I do hereby declare the following to be a full, clear, and exact description of the invention, such as will enable others skilled in the art to which it appertains to make and use the same.

This invention relates to improvements in calf weaners.

The principal object of the invention is to provide a simple device which will effectively perform the function for which it is intended and which can be comfortably worn by the calf, so as not to interfere with the calf nibbling the grass.

Other objects and advantages will be apparent from the following description, when taken in connection with the accompanying drawings.

Figure 1:
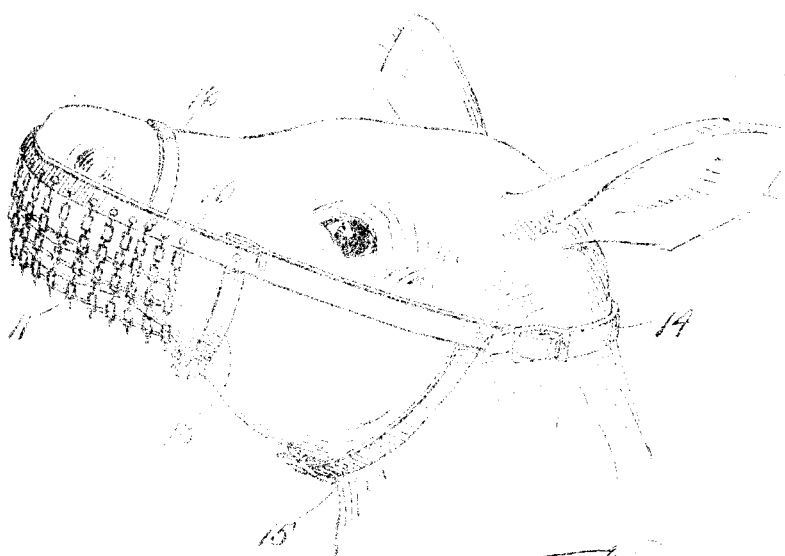
Figure 2:
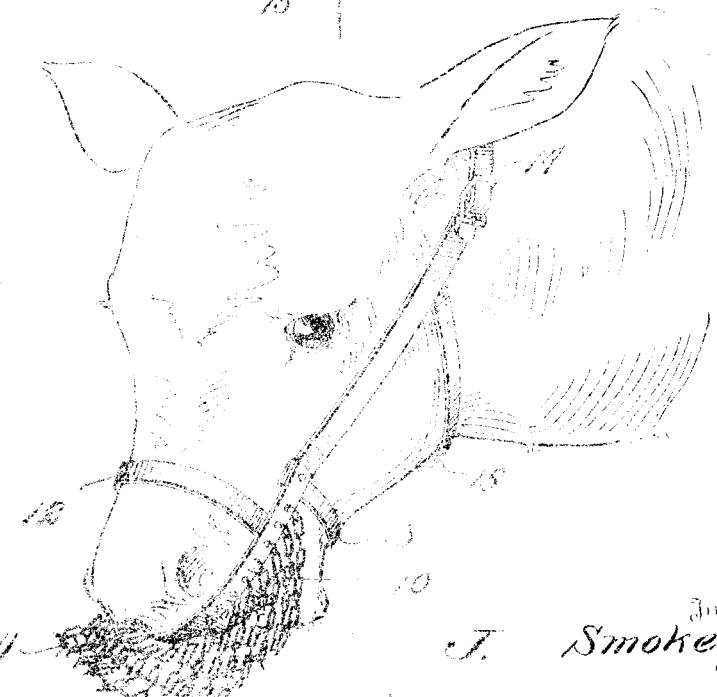

In the drawings: Figure 1 is a perspective view of the device showing the position of the same when the animal's head is raised. Fig. 2 is a perspective view showing the position of the device when the animal's head is lowered in the act of nibbling grass.

Referring particularly to the accompanying drawings, 10 represents a U-shaped member formed of some stiff rigid material such as metal or heavy leather. Secured to this U-shaped member is a depending chain mesh element 11 which depends in front of the mouth of the calf. It will be understood that the U-shaped member extends at the sides of the nose and around in front of the nose of the animal. Secured at its opposite ends to the side portions of the U-shaped member is a strap 12 which extends up over the animal's nose and supports the U-shaped member from falling down. Secured to the rear ends of the U-shaped member is an adjustable strap 13 which is buckled around under the animal's chin so as to prevent the U-shaped member from being forced upwardly. An adjustable head strap 14 has its ends secured to the rear ends of the U-shaped member. Connected to the side portions of the head strap and buckled around under the animal's neck is a strap 15. By means of the straps 12 and 13, the U-shaped member is prevented from vertical movement, the animal being effectively prevented from pushing the U-shaped member either above or below its normal position. The chain mesh is flexible, and when the animal lowers its head in the act of nibbling the grass, this chain will crumple up so that it will not interfere with the movements of the animal's mouth, but when the animal's head is raised this chain will depend in front of its mouth and effectively prevent the animal from nursing.

From the foregoing it will readily be seen that the device is simple in construction and can be comfortably worn by the animal as the chain mesh is soft and flexible and will not injure the animal's mouth or nose. Furthermore the chain mesh forms a perfect barrier in front of the animal's mouth to prevent nursing, while at the same time the nature of the mesh permits the same to collapse or crumple up when the animal desires to nibble grass.

What is claimed is:

A calf weaner comprising a U-shaped member disposed to embrace the animal's nose from the front and sides thereof, a nose strap connected to the U-shaped member, a chin strap connected with the rear ends of the U-shaped member, a head strap also connected to the U-shaped member, and a flexible chain mesh element depending from the U-shaped member in front of and at the sides of the animal's mouth, whereby the use of the animal's mouth below and to the rear of the chain mesh only is permitted.

In testimony whereof, I affix my signature, in the presence of two witnesses.

JOHN SMOKEY.

Witnesses:
 LEVI B. MOORE,
 CHARLES HIBBEN.